(12) United States Patent
Dutta et al.

(10) Patent No.: US 8,051,141 B2
(45) Date of Patent: Nov. 1, 2011

(54) CONTROLLED STORAGE UTILIZATION

(75) Inventors: Arijit Dutta, Bopodi (IN); Harpreet Singh Walia, Bangalore (IN)

(73) Assignee: Novell, Inc., Provo, UT (US)

( * ) Notice: Subject to any disclaimer, the term of this patent is extended or adjusted under 35 U.S.C. 154(b) by 125 days.

(21) Appl. No.: 12/576,520

(22) Filed: Oct. 9, 2009

(65) Prior Publication Data

US 2011/0087723 A1    Apr. 14, 2011

(51) Int. Cl.
G06F 15/16    (2006.01)
(52) U.S. Cl. ........ 709/217; 709/202; 709/218; 709/219; 709/225; 709/226; 709/229
(58) Field of Classification Search .................. 709/202, 709/217, 218, 219, 225, 226, 229
See application file for complete search history.

(56) References Cited

U.S. PATENT DOCUMENTS

| | | | |
|---|---|---|---|
| 5,341,478 A | 8/1994 | Travis et al. | |
| 6,134,594 A | 10/2000 | Helland et al. | |
| 6,199,108 B1 | 3/2001 | Casey et al. | |
| 6,530,077 B1* | 3/2003 | Marsh | 717/131 |
| 2002/0120741 A1* | 8/2002 | Webb et al. | 709/225 |
| 2006/0064576 A1* | 3/2006 | Chen | 713/2 |
| 2008/0281884 A1* | 11/2008 | Subrahmanyam | 707/205 |
| 2009/0172391 A1* | 7/2009 | Kasapidis | 713/156 |

FOREIGN PATENT DOCUMENTS

EP    1717696 A1    11/2006

* cited by examiner

*Primary Examiner* — Liangche A Wang
(74) *Attorney, Agent, or Firm* — Schwegman, Lundberg & Woessner, P.A.

(57) ABSTRACT

Apparatus, systems, and methods may operate to maintain a repository of stored executable images including a unique instance of an executable image comprising an operating system and at least a portion of one or more applications, and to provide substantially simultaneous executable access to a plurality of virtual or physical machines to execute portions of the executable image without constructing additional instances of the executable image. Additional apparatus, systems, and methods are disclosed.

19 Claims, 4 Drawing Sheets

CONTROLLED STORAGE UTILIZATION

BACKGROUND

As the virtualization of information technology infrastructure increases, so does the amount of storage space that is used. This trend may accelerate with the implementation of various cloud-computing scenarios. Indeed, the ease of virtualization tends to lure administrators into creating any number of virtual machines (VMs) without regard for the disk space that might be needed.

SUMMARY

In various embodiments, apparatus, systems, and methods that support controlled storage utilization are provided. For example, in some embodiments, storage utilization is controlled by maintaining a repository of stored executable images including a unique instance of an executable image comprising portions of an operating system and at least one application. Substantially simultaneous executable access is provided to a plurality of virtual or physical machines to execute portions of the executable image, without constructing additional instances of the executable image.

In some embodiments, storage utilization is controlled by fetching instructions using a node included in a plurality of nodes, wherein the instructions are included in an instance of an executable image comprising an operating system and at least one application. The executable image is unique among a plurality of stored executable images included in a repository, and the plurality of nodes have substantially simultaneous execution access to the executable image. Additional activities include executing the instructions by the node to run portions of the operating system or the application. Additional embodiments are described, and along with the foregoing examples, will be set forth in detail below.

DETAILED DESCRIPTION

Figure 1:
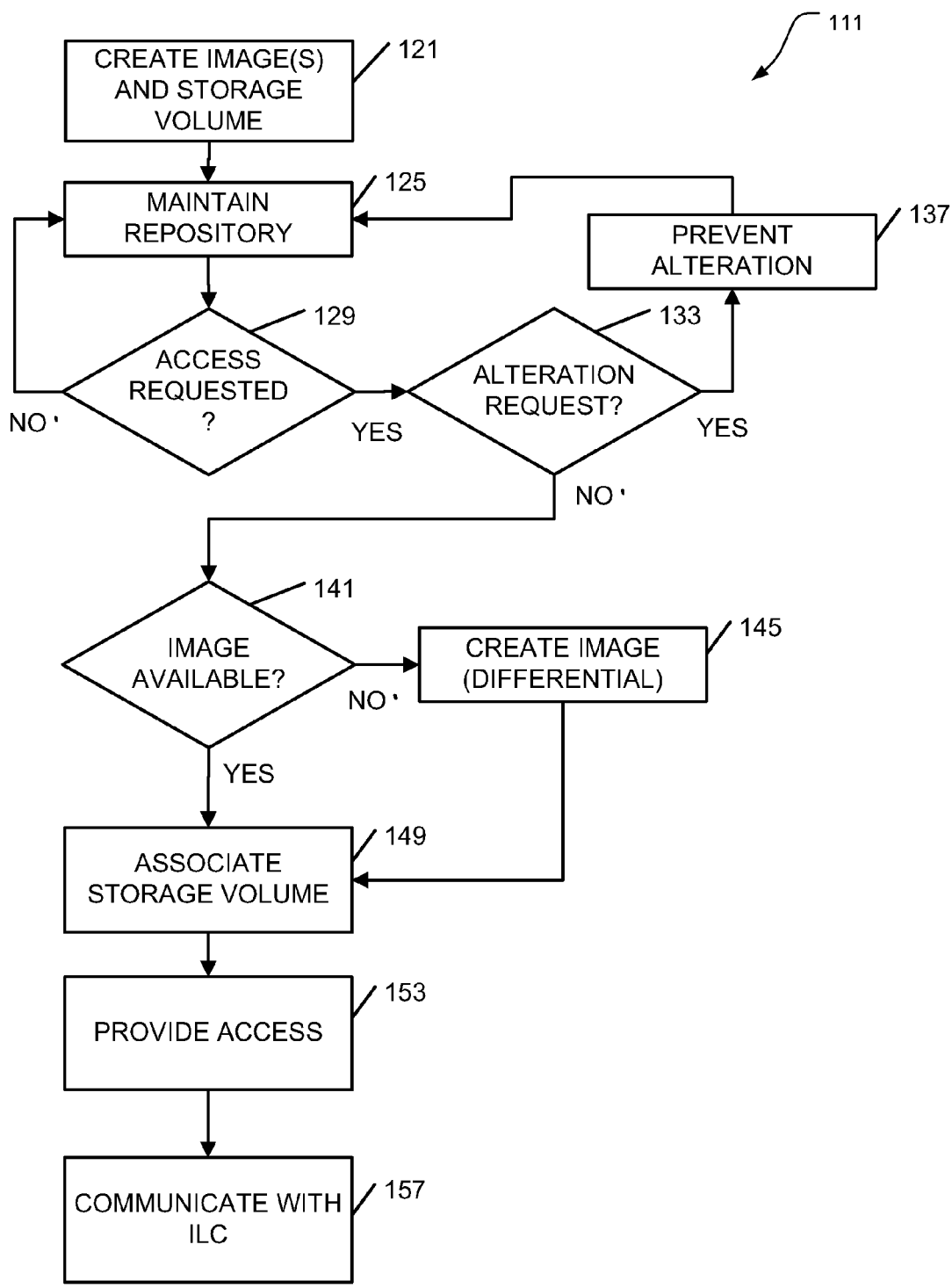
FIG. 1 is a flow diagram illustrating methods of controlled storage utilization according to various embodiments of the invention.

Large scale server virtualization has given rise to VM sprawl issues resulting in un-controlled multiple copies of the same operating system (OS) and applications. One way to solve this problem is to understand that many computing machines operate using images that include redundant OS components, as well as application components. Various embodiments described herein operate to reduce the amount of memory spent in storing these redundant components by maintaining a single image comprising an OS and selected applications on one node, such as a server node, that can be accessed at substantially the same time by multiple other nodes, such as client nodes—without making additional copies of the image.

For the purposes of this document, the term "executable image" means a set of instructions that comprise non-configurable portions of an OS and one or more applications. Images can be created as needed to accommodate different combinations of an OS and applications, or even a different OS. This approach is applicable to a virtualized environment, to a non-virtualized environment, and to combinations of both environments.

Consider two machines running the same OS. Each can be differentiated from the other by its static configuration and run time state. If these differences are maintained using a physical or virtual machine, the rest of the environment may be thought of as substantially the same. This viewpoint can be extended to the operations of machines hosting the same or slightly different sets of applications. With this perspective in mind, the disk storage used by a particular machine can be split up into three parts: (a) the OS+ application partition, (b) the machine configuration partition, and (c) the data partition. The contents of each partition will now be described.

The OS+ application partition (OSAP) contains at least one OS image, along with portions of installed applications. This partition does not include data used to configure either the OS or the application(s). Nor does it contain data that is particular to any one user. In some embodiments, the OSAP may comprise one or more executable images.

The machine configuration partition (MACP) contains all data elements that are used to configure the OS and applications in the OSAP. This includes both user and system configurable items, such as the host name and access credentials, among others. The MACP thus includes parameters/variables that applications use to function, or that alter the behavior of the OS and the applications in the OSAP, such as the network configuration, gateway Internet protocol (IP) address, the tool bar in a word processor, etc.

All user data is stored in the data partition (DAP). User data includes information that is collected over time when an individual user operates a particular machine, such as email content, the user's profile, the user's password, etc.

Traditional computing machines maintain individual copies of the machine computing environment in the form of an OS, application(s), and a stack fully configured with a data partition. That is, the OSAP, MACP, and DAP are all combined and maintained as an integrated unit on a traditional machine. Each traditional machine has its own copy of the information included in the three partitions.

As a matter of contrast, in the various embodiments described herein, a single instance of the OSAP is shared across multiple machines. That is, individual machines maintain copies of their own MACP and DAP, but not the OSAP. Instead, a particular enterprise can maintain a repository of unique images, each comprising a commonly-used OS and one or more applications. For example, each executable image in the repository may be similar to the base computing environment images that are maintained as copies by traditional machines, but without user-configurable elements or user data.

A physical or logical repository that contains a variety of unique OSAP executable images can be created within a given storage fabric and/or network. Once formed and entered into the repository, each unique image is not normally altered, unless by the system administrator, since that same image is used by multiple users at substantially the same time, and any change to the image will affect all such users.

Thus, in some embodiments, a storage management layer (SML) can operate to create an abstracted logical volume, perhaps as part of a storage area network (SAN) switch, residing within the storage fabric as part of the network, or as a separate, independent entity (e.g., as a server). In this way, each machine, such as a client node, can have a logical storage volume associated with it that points to the desired image in the repository. The unique images remain unique, and are not replicated.

To implement some embodiments, an image loader-controller (ILC) can be used by an individual machine, whether virtual or physical, instead of an OS. The ILC can be configured to point to a location in the network where it can load instructions from an image. Thus, in some embodiments, the ILC can be implemented as an add-on module to a "pre-boot agent", providing additional intelligence and responsibility to maintain memory pages and stacks on the individual machine so that appropriate OS and application instructions can be fetched from the unique OSAP image. The fetched instructions can then be loaded into registers of the physical or virtual machine processor, and executed.

In summary, the ILC is responsible for fetching instructions from the correct OSAP image in a common image repository, as well as managing run-time program stacks and other registry variables, which collectively define the temporal state of an individual computing machine. To accomplish these tasks, the ILC can be used to create and manage the MACP.

The MACP can thus be maintained by the ILC on the actual computing machine so as to manage configuration settings, registry variables, and other elements that provide the individual character to each computing machine's processing environment. The ILC can likewise be responsible for requesting the correct memory page based on the stack pointer position and other program counters. In this way, the computing machine can operate under the illusion that it is requesting pages of instructions from its own private copy of the OS and applications. The ILC can exist on a physical machine or as a layer working in conjunction with a hypervisor.

As various tasks are carried out on a particular machine, a user may determine that a new application should be installed. In this case, if a unique image that includes the needed application already exists, then the image containing the application can be soft-linked to the machine's logical volume. If the needed application is not present in one of the images in the repository, then a new image that includes the application, in addition to the other applications present in the current image (or independent of the other applications) can be created on-the-fly in the repository, so that other users with the same needs can have access to the unique image that is generated as a result.

Introducing a new application to a client node that requests the same can be accomplished in at least two ways. The first involves creating an entirely new unique image that includes an OS and the needed application, along with other applications, as desired.

The second is external to the system, and involves installing the desired application onto the image currently in use. In this case, the block level difference between the resulting, modified image and the unmodified image is determined. This difference, along with the unmodified image, are then stored together as a new unique image in the repository.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

FIG. 1 is a flow diagram illustrating methods 111 of controlled storage utilization according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, controlled storage utilization is now discussed with reference to FIG. 1.

In some embodiments, a processor-implemented method 111 that can be executed on one or more processors that perform the method may operate to provide, from the perspective of the repository, the services of maintaining a set of unique images in the repository, and providing substantially simultaneous access to each one of the images for a plurality of nodes. That is, common execution access to a repository of unique images, each containing an OS and at least one application, can be provided by the repository.

As noted previously, logical storage volumes can be created to hold machine-specific partitions, perhaps using one volume per machine. Thus, the method 111 may begin at block 121 with creating one or more unique executable images, each comprising an OS and portions of one or more applications, and creating an abstracted logical storage volume associated with the executable image and with each one of one or more virtual or physical machines. The method 111 may continue on to block 125 with maintaining a repository of stored executable images including a unique instance of an executable image comprising an OS and at least a portion of one or more applications.

The applications in an executable image may comprise portions of any one or more of a number of common applications. Thus, the following list of potential applications is merely indicative and not restrictive: word processing applications, presentation applications, spreadsheet applications, email applications, database applications, and browser applications, among others.

If access to an image in the repository is not requested at block 129, the method 111 may return to maintaining the repository at block 125. Otherwise, if access to an image in the repository is requested at block 125, the method 111 may continue on to block 133 to determine whether the access requested involves an improper image alteration request. If so, then the method 111 may proceed to block 137 with, for example, preventing alteration of the executable image by any one of the virtual or physical machines that may be seeking access. In this way, the repository, or some other entity, may operate to prevent alteration of the executable image by any of the machines attempting to access the repository.

If improper access to an image in the repository has not been requested, as determined at block 133, then the method 111 may proceed to block 141, to determine whether the requested image is available within the repository. If not, then the method 111 may proceed to block 145 with creating a single new executable image in response to receiving a request from virtual or physical machines to execute an additional application different from the application(s) included in the current image. The new executable image can be used to form a part of the repository, and comprise the additional application, the OS, and portions of the one or more application that made up the unmodified image. In this way, when a request to execute an application that is not included in the currently-executing image is received, a completely new image can be created to provide the (formerly) unavailable application to the requesting machine.

In some embodiments, when a request to execute an application that is not included in the currently-executing image is received, a differential image can be created to provide the (formerly) unavailable application to the requesting machine. The differential image may be installed in the repository or on the requesting machine, as desired. Thus, the activity at block 145 may comprise creating a differential image in response to receiving a request to execute an additional application different from the currently executing application(s) included in the unmodified image, the differential image comprising instructions from at least a portion of the additional application. In either case, the method may proceed from block 145 to block 149.

If the requested image is available within the repository, as determined at block 141, the method 111 may proceed directly to block 149 by associating a storage volume (logical or physical) with one or more virtual or physical machines and a single, unique executable image in the repository. Thus, the activity at block 149 may comprise creating an abstracted logical storage volume associated with the executable image and with each one of the virtual or physical machines.

The method 111 may continue on to block 153 with providing substantially simultaneous executable access to a plurality of virtual or physical machines to execute portions of the executable image without constructing additional instances of the executable image.

In some embodiments, an ILC is implemented. Thus, the method 111 may include, at block 157, communicating with at least one ILC associated with each one of the virtual or physical machines, the ILC to fetch instructions included in the executable image for execution by the virtual or physical machines. In this way, the repository can communicate with ILCs to manage substantially simultaneous access to the executable image. Other embodiments may be realized.

Figure 2:
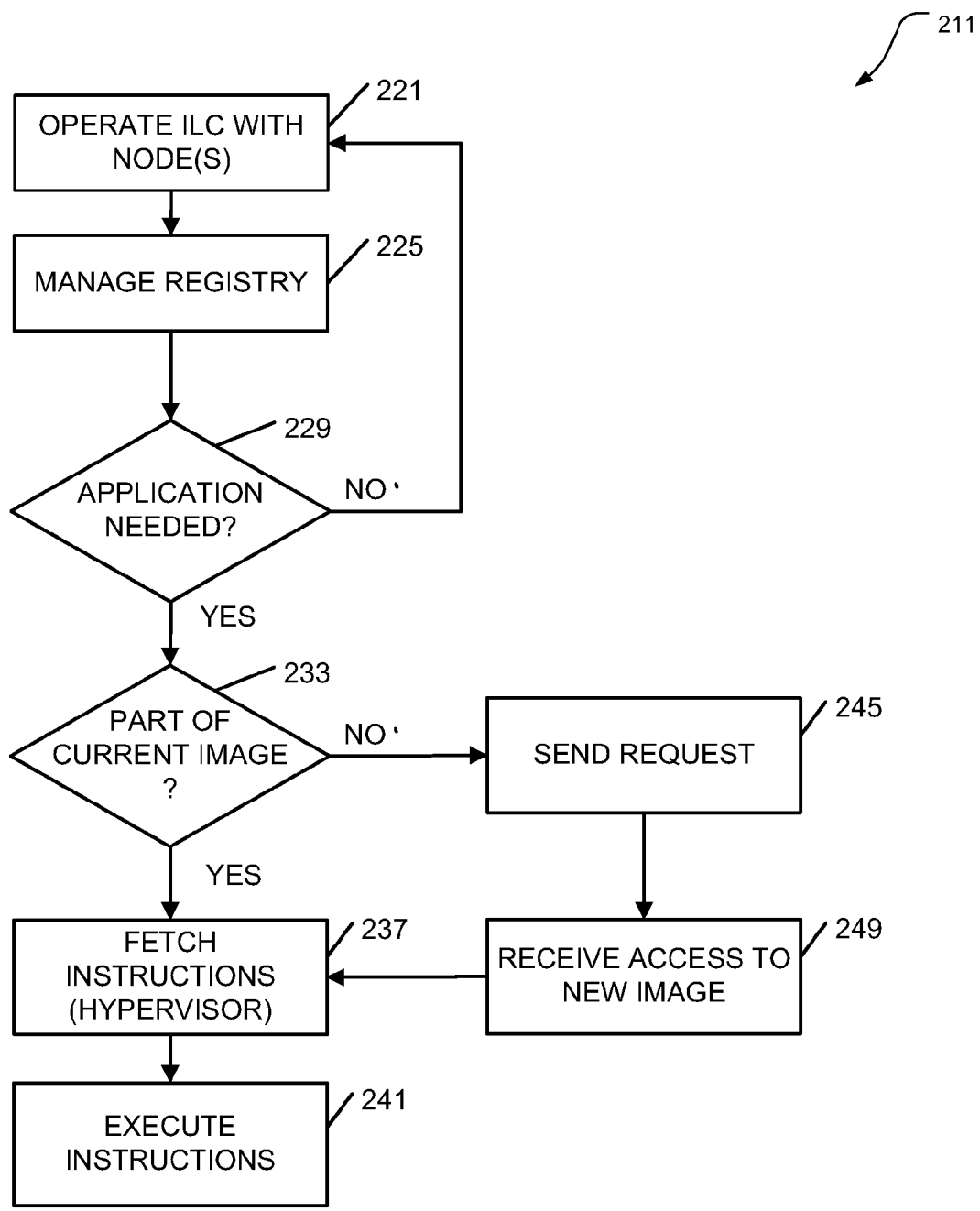
FIG. 2 is a flow diagram illustrating additional methods of controlled storage utilization according to various embodiments of the invention.

For example, FIG. 2 is a flow diagram illustrating additional methods 211 of controlled storage utilization according to various embodiments of the invention. In this case, the methods 211 are viewed from the perspective of the accessing node: instructions in a unique repository image are fetched by one or more nodes for execution. Each node has non-exclusive and substantially simultaneous access to the instructions contained in a single executable image.

The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may begin at block 221 with operating at least one ILC in conjunction with each one of a plurality of nodes that attempt to access the repository of unique images. In this way, each node can be associated with an ILC, if desired.

Nodes may take the form of physical or virtual machines. Thus, the plurality of nodes may comprise physical machines, virtual machines, and combinations of these.

As noted previously, registry variables can be maintained in partitions (e.g., a MACP and DAP) separate and apart from the partition that includes the executable image (e.g., an OSAP). It should be noted that in many embodiments, the registry comprises a generic set of system settings and is not necessarily specific to a Microsoft® Windows® registry. Thus, the method 211 may continue on to block 225 with managing registry variables to define a temporal state of the accessing node using one or more partitions different from a partition that includes the executable image.

If access to an application is not needed, as determined at block 229, then the method 211 may return to block 221, with operating an ILC for one or more nodes. Otherwise the method 211 may continue on to block 233.

Requests for access to applications that are not included in the current executable image may result in receiving access to a new image that includes the requested application. Thus, the activity at block 233 may comprise determining whether the application to be accessed forms part of the current image to which access has been granted. If not, then the method 211 may proceed on to block 245 with transmitting a request to execute an additional application different from the one or more applications included in the image currently being executed. The method 211 may continue on to block 249 with receiving execution access to a single new executable image in response to the request, the new executable image comprising at least a portion of the additional application, the OS, and the one or more applications (included in the image previously being executed).

At this point, the method 111 may proceed from either bock 233 or block 249 to block 237 with fetching instructions by at least one node included in a plurality of nodes, wherein the instructions are included in an instance of an executable image comprising an OS and at least a portion of one application, wherein the executable image is unique among a plurality of stored executable images included in a repository, and wherein the plurality of nodes have substantially simultaneous execution access to the executable image.

A hypervisor may be used to accomplish ILC functions when the machine accessing (or attempting to access) the repository is a VM. Thus, the activity at block 237 may comprise executing a hypervisor to accomplish instruction fetching. The method 211 may continue on to block 241 to include executing the instructions by the at least one node to run portions of the OS or portions of the one or more applications included in the executable image.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of controlled storage utilization shown in FIGS. 1 and 2 can be implemented in various devices, as well as in a computer-readable storage medium, where the methods are adapted to be executed by one or more processors. Further details of such embodiments will now be described.

Figure 3:
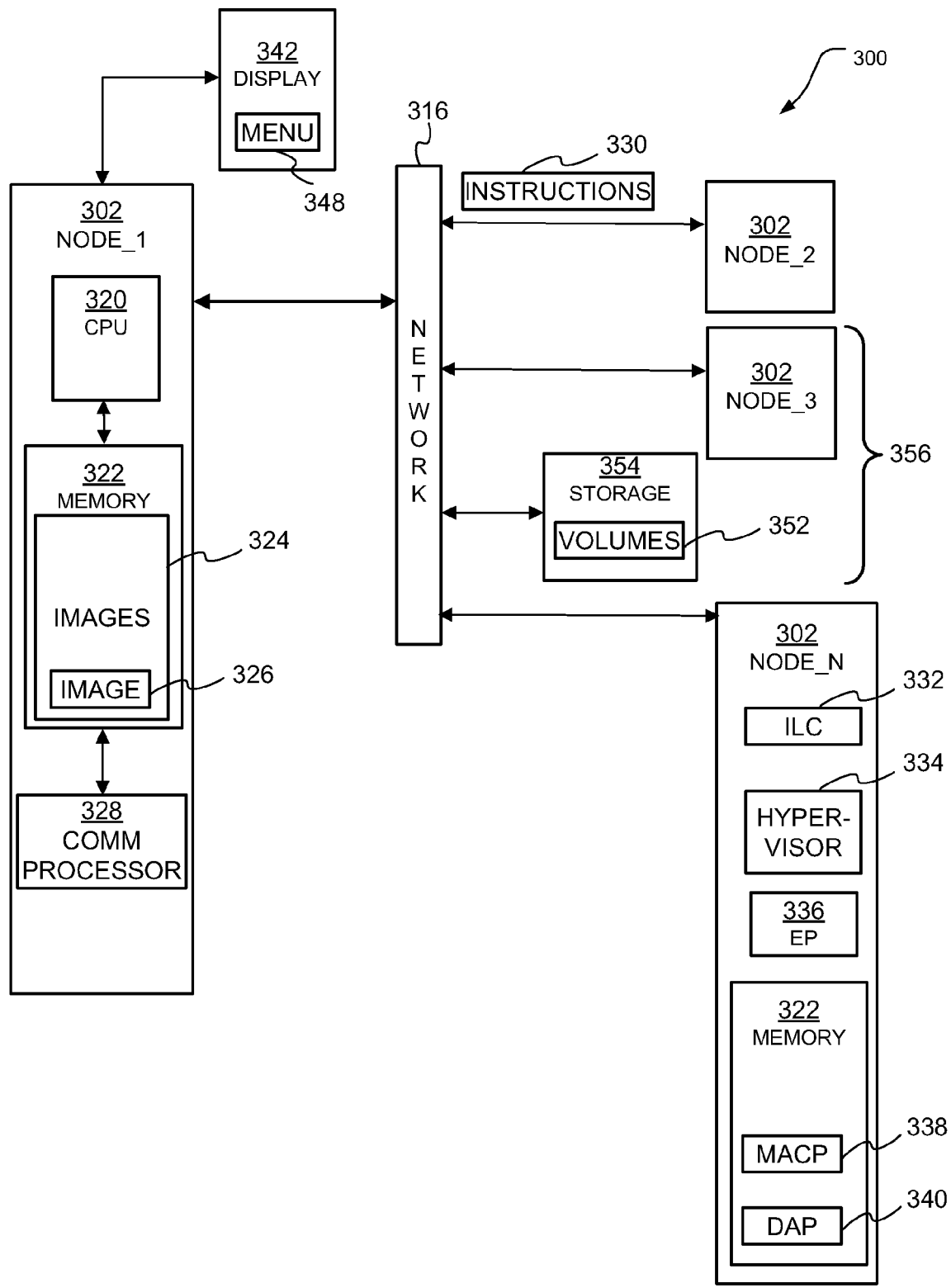
FIG. 3 is a block diagram of apparatus and systems according to various embodiments of the invention.

FIG. 3 is a block diagram of apparatus 300 and systems according to various embodiments of the invention. Here it can be seen that an apparatus 300 used to implement controlled storage utilization may comprise one or more processing nodes 302, one or more processors 320, multiple memories 322, a monitoring module 326, a communication processor 328, and a display 342. The apparatus 300 may comprise a client, a server, or some other networked processing node.

The processing nodes 302 may comprise physical machines or virtual machines, or a mixture of both. The nodes 302 may also comprise networked entities, such servers and/or clients. In some basic implementations, the operations described can occur entirely within a single node 302.

In some embodiments, then, an apparatus 300 may comprise a node 302 (e.g., NODE_1, perhaps operating as a server), which includes an image repository 324 and a processor 320 to grant substantially simultaneous access to images in the repository 324.

In some embodiments, an apparatus 300 comprises a first node 302 (e.g., NODE_1) including a repository 324 of stored executable images including a unique instance of an executable image 326 comprising an OS and at least a portion of one or more applications. The apparatus 300 may further comprise a communications processor 328 included in the first node NODE_1 to provide substantially simultaneous executable access to a plurality of virtual or physical machines (e.g., NODE_2 and NODE_3) to execute portions of the executable image 326 without constructing additional instances of the executable image 326.

The apparatus 300 may include a second node that forms part of an SML. Thus, the apparatus 300 may further comprise a second node (e.g., storage node 354) to create a plurality of abstracted logical storage volumes 352 associated with the executable image 326 and with each one of the virtual or physical machines (e.g., NODE_2 and NODE_3).

The logical volumes 352 can be used to store the MACP and the DAP for each machine. Thus, the abstracted logical storage volumes 352 may be linked to the executable image 326 to permit storage of registry variables associated with corresponding ones of the virtual or physical machines. Still further embodiments may be realized.

For example, it can be seen that in another embodiment a node 302 (e.g., NODE_N), such as a client, can be associated with an ILC 332 to fetch instructions 330 that form the executable image 326. The node NODE_N includes an execution processor 336 to execute the instructions 330.

Thus, in some embodiments, an apparatus 300 may comprise a node 302 (e.g., NODE_N) to access an ILC 332 to fetch instructions 330, wherein the instructions 330 are included in an instance of an executable image 326 comprising an OS and portions of one or more applications. The executable image 326 is unique among a plurality of stored executable images included in a repository 324. A plurality of nodes 302 (e.g., NODE_2 and NODE_3), including NODE_N, have substantially simultaneous execution access to the executable image 326. The apparatus 300 may further comprise an execution processor 336 that is included in the node NODE_N to execute the instructions 330 to run portions of the OS or the one or more applications included in the image 326.

Physical nodes can have resident ILCs, and virtual nodes can operate under a hypervisor that provides ILC functionality. Thus, the node 302 (e.g., NODE_N) may comprise a physical machine having the ILC 332 installed thereon, or a VM associated with a hypervisor to perform functions of the ILC 332.

The ILC 332 can be used to maintain the MACP 338 and/or the DAP 340. Thus, in some embodiments, the ILC 332 is used to maintain a MACP 338 and a DAP 340 with respect to the node NODE_N (or any other nodes 302, such as NODE_2 and/or NODE_3).

A system that operates to implement controlled storage utilization may comprise multiple instances of the apparatus 300. The system might also comprise a cluster of nodes 302, including physical and virtual nodes. It should be noted that any of the nodes 302 may include any one or more of the elements explicitly shown in nodes NODE_1, ..., NODE_N, in any combination.

The nodes 302 may exist as a device embedded within another structure (e.g., as an embedded device), or as a regular desktop or laptop computer that includes a display 342 to show the activities conducted while the node 302 is active. Thus, the system may also comprise a display 342 coupled to the nodes 302 to display visible indications 348 of the activities conducted at the nodes 302.

The apparatus 300 and system may be implemented in a machine-accessible and readable medium that is operational over one or more networks 316. The networks 316 may be wired, wireless, or a combination of wired and wireless. The apparatus 300 and system can be used to implement, among other things, the processing associated with the methods 111 and 211 of FIGS. 1 and 2, respectively. Modules may comprise hardware, software, and firmware, or any combination of these. Additional embodiments may be realized.

Figure 4:
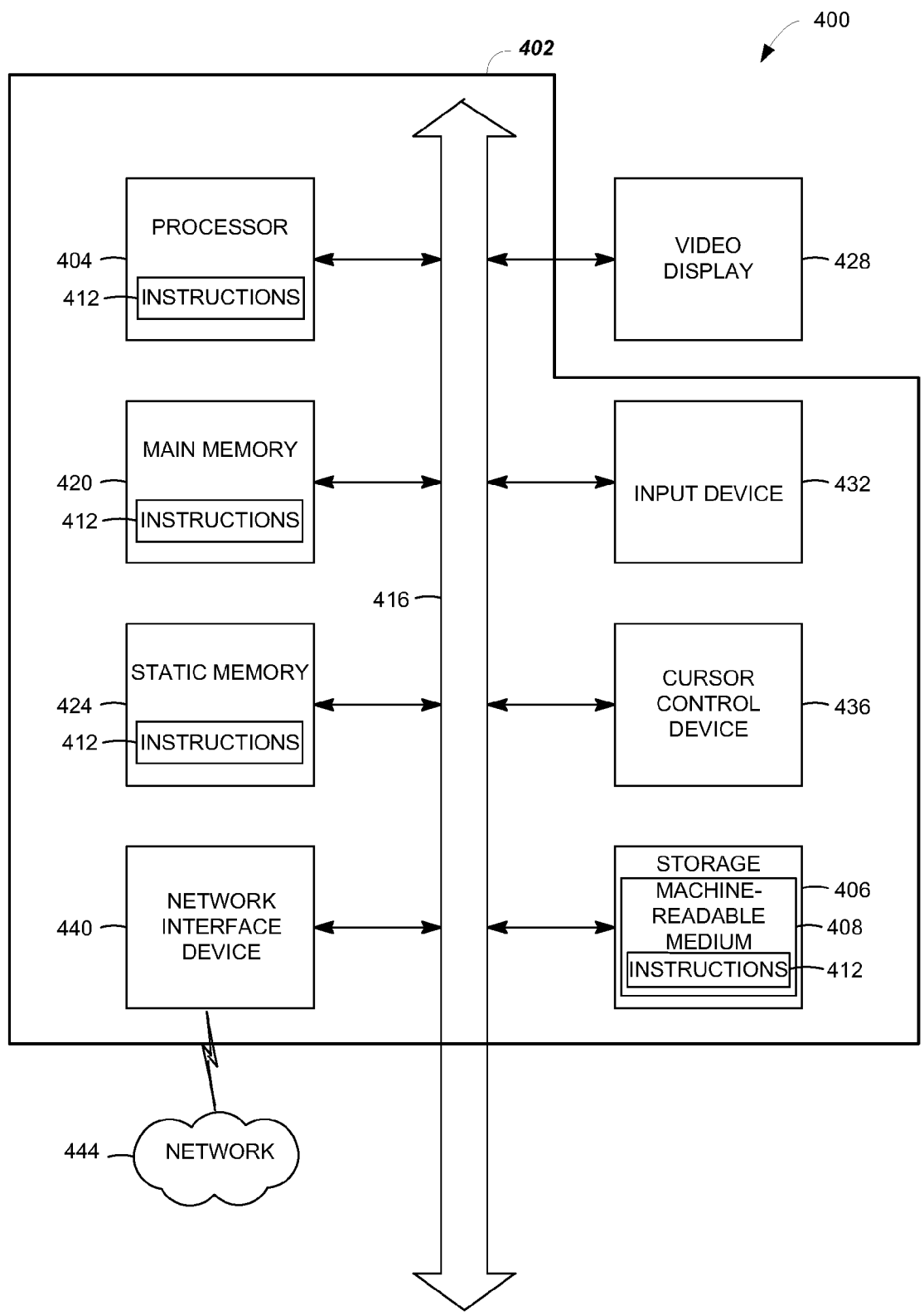
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to logically separate a computing machine image into multiple parts, so that a single, unique copy of a portion of that image can be made available to service multiple users. The various embodiments thus have the potential to significantly reduce the amount of memory used with respect to a particular computing device. In addition, the use of unique images in an enterprise may help enforce consistency with respect to machine operations among a large population of users. Application access may thus become more efficient, providing higher performance and a simplified desktop experience. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a first node including a repository of stored executable images including a unique instance of an executable image comprising an operating system and at least a portion of one or more applications; and
   a communications processor included in the first node to provide substantially simultaneous executable access to a plurality of virtual or physical machines to execute portions of the executable image without constructing additional instances of the executable image, wherein the first node is to receive a request to execute an additional application different from the one or more applications, and to permit execution access to a single new executable image in response to the request, the new executable image comprising at least a portion of the additional application, the operating system, and the one or more applications.

2. The apparatus of claim 1, further comprising:
   a second node to create a plurality of abstracted logical storage volumes associated with the executable image and with each one of the virtual or physical machines.

3. The apparatus of claim 2, wherein the abstracted logical storage volumes are to be linked to the executable image to permit storage of registry variables associated with corresponding ones of the virtual or physical machines.

4. An apparatus, comprising:
   a node to access an instruction loader-controller to fetch instructions, wherein the instructions are included in an instance of an executable image comprising an operating system and at least a portion of one or more applications, wherein the executable image is unique among a plurality of stored executable images included in a repository, and wherein a plurality of nodes including the node have substantially simultaneous execution access to the executable image; and
   an execution processor included in the node to execute the instructions to run portions of the operating system or the at least a portion of the one or more applications, wherein the node is to transmit a request to execute an additional application different from the one or more applications, and to receive execution access to a single new executable image in response to the request, the new executable image comprising at least a portion of the additional application, the operating system, and the one or more applications.

5. The apparatus of claim 4, wherein the node comprises a physical machine having the instruction loader-controller installed thereon, or a virtual machine associated with a hypervisor to perform functions of the instruction loader-controller.

6. The apparatus of claim 4, wherein the instruction loader-controller is to maintain a machine configuration partition and a user data partition with respect to the node.

7. A processor-implemented method to execute on one or more processors that perform the method, comprising:
maintaining a repository of stored executable images including a unique instance of an executable image comprising an operating system and at least a portion of one or more applications;
providing substantially simultaneous executable access to a plurality of virtual or physical machines to execute portions of the executable image without constructing additional instances of the executable image;
receiving a request to execute an additional application different from the one or more applications; and
permitting execution access to a single new executable image in response to the request, the new executable image comprising at least a portion of the additional application, the operating system, and the one or more applications.

8. The method of claim 7, further comprising:
creating an abstracted logical storage volume associated with the executable image and with each one of the virtual or physical machines.

9. The method of claim 7, the one or more applications comprising at least one of a word processing application, a presentation application, a spreadsheet application, an email application, a database application, or a browser application.

10. The method of claim 7, further comprising:
creating the single new executable image in response to receiving the request.

11. The method of claim 7, further comprising:
creating a differential image in response to receiving a request to execute an additional application different from the one or more applications, the differential image comprising instructions from at least a portion of the additional application.

12. The method of claim 7, further comprising:
communicating with at least one image loader-controller associated with each one of the virtual or physical machines, the image loader-controller to fetch instructions included in the executable image for execution by the virtual or physical machines.

13. The method of claim 7, further comprising:
preventing alteration of the executable image by any one of the virtual or physical machines.

14. A processor-implemented method to execute on one or more processors that perform the method, comprising:
fetching instructions by at least one node included in a plurality of nodes, wherein the instructions are included in an instance of an executable image comprising an operating system and at least a portion of one or more applications, wherein the executable image is unique among a plurality of stored executable images included in a repository, and wherein the plurality of nodes have substantially simultaneous execution access to the executable image;
executing the instructions by the at least one node to run portions of the operating system or the at least a portion of the one or more applications;
transmitting a request to execute an additional application different from the one or more applications; and
receiving execution access to a single new executable image in response to the request, the new executable image comprising at least a portion of the additional application, the operating system, and the one or more applications.

15. The method of claim 14, further comprising:
operating at least one image loader-controller in conjunction with each one of the plurality of nodes.

16. The method of claim 15, wherein the plurality of nodes comprise at least one physical machine or at least one virtual machine.

17. The method of claim 14, further comprising:
managing registry variables to define a temporal state of the at least one node using one or more partitions different from a partition that includes the executable image.

18. The method of claim 17, wherein the one or more partitions comprise a machine configuration partition and a user data partition.

19. The method of claim 14, further comprising:
executing a hypervisor to accomplish the fetching.

* * * * *